United States Patent Office 3,519,401
Patented July 7, 1970

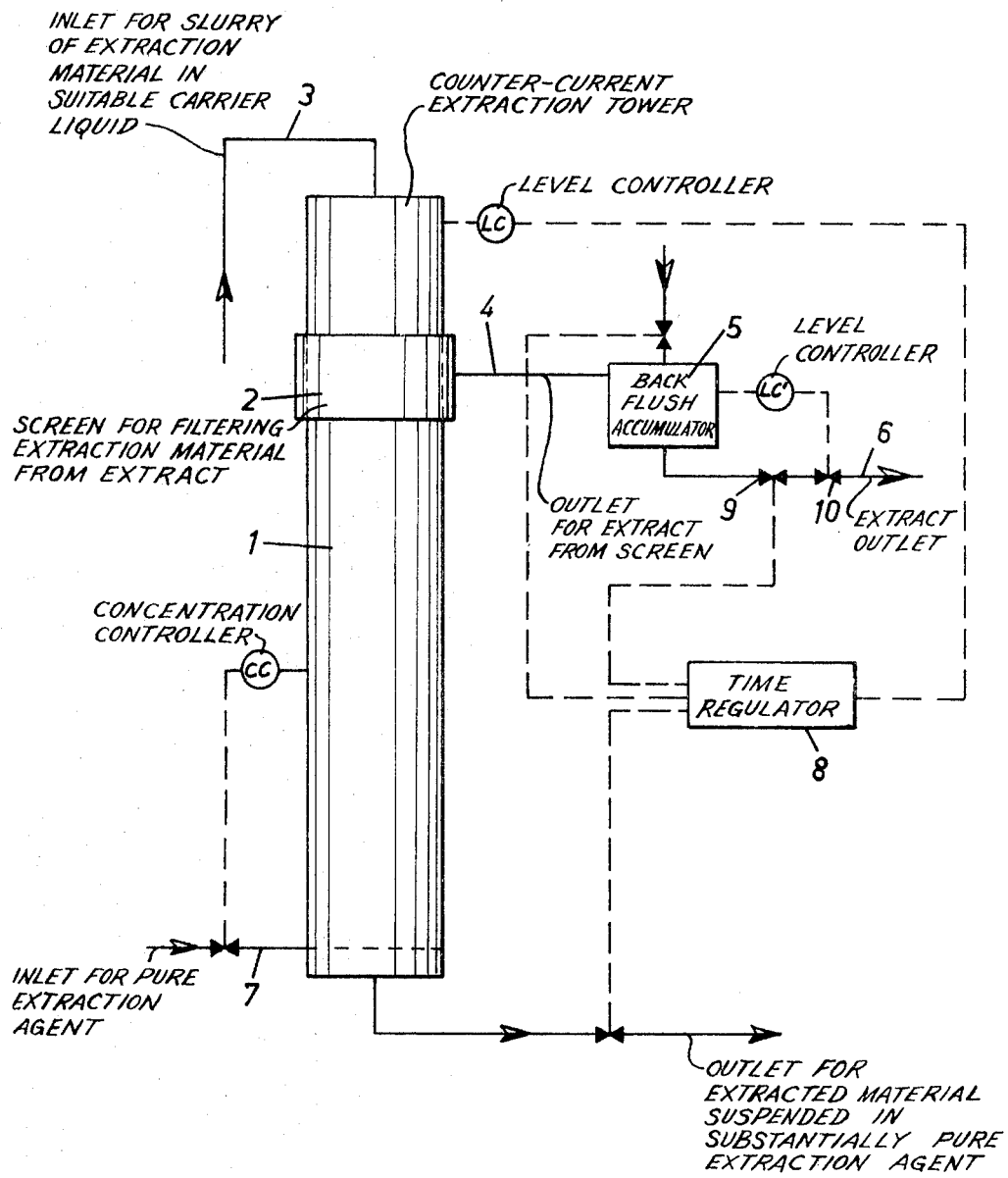

---

3,519,401
PROCESS FOR FILTERING AND COUNTERCURRENT EXTRACTING A SUSPENSION OF SOLIDS IN A LIQUID SUSPENDING MEDIUM
Lars Gunnar Hellman, Norrtullsgatan 10,
Stockholm Va, Sweden
Filed Apr. 22, 1966, Ser. No. 544,526
Claims priority, application Sweden, May 5, 1965,
5,909/65
Int. Cl. B01d 11/04
U.S. Cl. 23—310        8 Claims

ABSTRACT OF THE DISCLOSURE

A slurry comprising, for example, cellulose fibers suspended in waste liquor, is contacted with water in a countercurrent extraction tower. The slurry is filtered through a screen in the tower to produce an extract comprising waste liquor and a cake of fibers on the screen. Periodically, the screen is back flushed with extract to loosen the cake and simultaneously with the back flushing, a pulsating movement of the material in the tower is caused to carry the cake away from the screen and toward its outlet.

---

This invention relates to a process for filtering and countercurrent extracting a suspension of solids in a liquid suspending medium, in which the suspension is introduced at one end of a tower provided near said one end with screen means having screening surfaces parallel to the longitudinal axis of the tower, e.g. arranged in the mantle of the tower, while extracting liquid is continuously supplied to the tower at the other end thereof, extracted solids suspended in substantially pure extracting liquid are discharged from said other end, and extract is withdrawn from the tower through the screen means.

If in an empty tower having a cylindric or other type of cross section a liquid is forced to flow through a slurry of e.g. a fibrous material channels are easily formed in the fibrous material, the liquid flowing in these channels to a smaller or greater extent while in interjacent parts said fibrous material will be surrounded by more or less immobile liquid. Since this liquid is displaced relatively slowly the effectiveness of the extracting process will be reduced. This may to some extent be compensated for by an increase of the distance and/or the residence time of the material which is subjected to extracting. Another possibility which has been tested is stirring of the extraction material by means of mechanical devices such as slowly rotating agitators consisting of wings which move in different horizontal planes in the vertical extraaction tower.

It is an object of this invention to eliminate to the utmost possible extent the forming of channels in the extraction material when carrying out an extraction process of the above-mentioned type and make more effective the extracting.

It is a further object of this invention to efficiently and without causing major interruptions of the extraction and filtering process provide means to detach and remove the filter cake.

The objects, purposes and aims of the invention are accomplished, at least in part, in a process for filtering and counter-current extracting of a suspension of solids in a liquid suspending medium, such as for example, a suspension of cellulose fibers in waste liquor from a cellulose digestion process. The suspension is introduced into a tower at one end thereof, said tower being provided with screen means disposed in the vicinity of said one end, said screen means having screening surfaces disposed parallel to the longitudinal axis of said tower. An extracting liquid, such as water, is continuously supplied to the tower at the other end thereof, and extracted solids suspended in substantially pure extracting liquid are discharged from said tower at said other end thereof. An extract, for example recovered waste liquor, is removed from the tower through said screen means, there thus being formed a filter cake agglomerating on said screen means. In accordance with the invention, the filter cake is periodically detached from the screen means and fed through the tower towards said other end thereof by means of intermittently returning a minor amount of the removed extract through the screen means to the tower at uniform intervals of time and in timed relationship with a pulsating movement of the materials in the tower. The pulsating movement is effected by instantaneously introducing a large amount of the suspension at said one end of the tower and/or instantaneously discharging a large amount of the extracted solids suspended in substantially pure extracting liquid from said other end of said tower, simultaneously with each intermittent return of extract through said screen means.

In accordance with the present invention a minor amount of the withdrawn extract is fed back at uniform time intervals through the screen means and at the same time the material in the tower is subjected to a pulsating movement by supplying of a relatively large amount of suspension of solids and/or discharging of a relatively large amount of extracted material. This causes a displacement of the extraction material and the result is that the effect of the above said channel forming is avoided to a great extent and a further improvement of the extraction is obtained.

In the filtering and counter-current process of this invention the filter cake thus gradually formed on the screen means is periodically detached from the screen means and fed through the tower towards its other end by means of intermittently and preferably at uniform time intervals feeding a minor amount of the withdrawn extract back into the tower through the screen means, while the materials residing in the tower are subjected to a pulsating movement simultaneously with each return of extract through the screen means, this pulsating movement being each time effected by an instantaneous introduction of a relatively large amount of suspension at said one end of the tower and/or by instantaneous discharge of a relatively large amount of extracted solids and extracting liquid from said other end of the tower.

The solid material is preferably supplied in suspended form in extract already withdrawn. The nature of the solid material and the extracting liquid may be varied within wide limits. Thus, the solid material may preferably consist of an organic, especially a fibrous organic material such as cellulose fibers suspended in waste liquor obtained from a cellulose digestion process or beet chips suspended in already obtained unrefined juice. Even coffee designed for the preparing of so-called "instant coffee," spices for the preparing of vermouth extract and mash or steep liquor used in for instance the preparing of beer may be treated by means of the process according to the present invention. However, inorganic solid materials or mixed inorganic and organic materials may be used such as sand mixed with oil, the sand being washed with a solvent, bone meal and ores, which are leached with water, diluted acids or other leaching liquids. The present process may also be used for the washing of filtering auxiliary agents, e.g. diatomaceous earth, the separation of gypsum from digestion pastes in the superphosphate industry, the washing of oil from bleaching earth in the margarine preparation and so on.

The screen means in the tower may be constructed as a portion of the wall of the tower. Outside the screening surface a collecting chamber for the filtrate is arranged. Possibly, the screen means may also comprise double walled built-in elements in the tower, concentric or placed as parallel chords the sides of which parallel to the axis of the tower consist of screen plates. The distance between these screen plates in the radial direction depends upon the perviousness of the extraction material, a smaller distance between the opposite filtering surfaces being used in the case of less perviousness and a larger distance in the case of a better perviousness.

The distance between two opposite screen surfaces should amount to about 3 times the thickness of the final filter cake.

The tower is preferably vertically built, having a circular cross section and the screen means arranged for instance in the lower portion of the tower. The extraction material which suitably is a slurry with pumping qualities in the already withdrawn extract in this case is fed in at the lower portion of the tower at uniform time intervals in the form of an instantaneous large introduced amount of this slurry. At the same time a smaller instantaneous return of extract previously withdrawn through the screen means takes place and the extract is pressed through the screen means in the opposite flow direction. Thus, the filter cake formed on the screen sheet is detached and is pressed upwards and past that section of the tower where the screen surface is placed when extraction material is supplied to the tower. During the time intervals between these back-feedings extract is withdrawn through the screen means, and the amount of extract which was large to begin with is gradually reduced as the filter cake increases in thickness and imperviousness. After a suitable time interval the back-feeding process is repeated whereby the new resulting filter cake is pressed upwards and past the screen means.

At the top of the tower the desired wash liquid or extraction agent is introduced. Also from the top of the tower the completely extracted material is discharged which thus in a way known per se has at the end contacted the pure extraction agent and attains a high degree of purity.

In case the extract has a lower specific gravity than the pure extraction agent the flow directions of the extraction tower may be reversed whereby the screen means has to be placed in the upper portion of the tower and the discharge of the completely extracted material takes place intermittently from the bottom of the tower. Also in this case a reversing of the flow direction through the screen means takes place simultaneously with the instantaneous relatively large discharge of extracted material and liquid and the filter cake is thus detached and is able to be pushed downwards in this case.

The efficiency of the extraction process according to the present invention is determined by the residence time of the extraction material in the tower, namely the volume of the tower. The cross section of the tower should be chosen in such a way that the flow rate of the liquid will not result in that the extraction material is packed up which deteriorates the perviousness. The height of the tower should be at least 5 times its diameter but may in certain cases when a high efficiency is essential and when the mechanical stability of the extraction material is good be increased to 10–15 times the diameter of the tower.

When the introduction of the suspension of solids takes place in a pulsating way it may be carried out by means of a pump having a great capacity and working intermittently or by means of a container the contents of which are emptied intermittently using pressurized air or the like.

The attached drawing shows as an example a suitable arrangement for the realization of the process according to the present invention. It is to be understood, however, that the present invention is not in any way restricted to the embodiment shown in the drawing.

In the drawing 1 is a tower having screen means 2. Extraction material suspended in a suitable liquid is continuously introduced through pipe 3 at the top of the tower and moves downwards towards screen means 2 during the pressing out of extract through pipe 4, container 5 and pipe 6 to a collection chamber not shown. At the bottom of the tower pure extraction agent is introduced through pipe 7, whereby the introduced amount is controlled by means of concentration regulator CC. The pure extraction agent extracts the desired product from the extraction material in the upper part of the tower and is also discharged as an extract through screen means 2.

At a proper time determined by the time regulator device 8 controlled by a level regulator LC the withdrawal of extract is shut off by means of valve 9 and pipe 6 and extract present in container 5 is pressed back through pipe 4 and screen means 2 whereby the filter cake on the screens is detached and fed downwards through the tower. At the same time extracted material suspended in substantially pure extraction agent is discharged from the bottom of the tower. When container 5 has been emptied the extraction is repeated as before without withdrawing extracted material from the bottom of the tower.

I claim:

1. In a process for filtering and countercurrent extracting a suspension of solids in a liquid suspending medium, in which said suspension is introduced into an elongated tower at one end thereof, said solids being distributed substantially throughout the entire longitudinal extent of said tower and being in various stages of processing, said solids migrating generally from said one end of the tower toward the other end thereof at a normal overall average rate of movement, said tower being in the vicinity of said one end provided with screen means having screening surfaces disposed substantially parallel to the longitudinal axis of said tower, while extracting liquid is continuously supplied to said tower at said other end thereof, extracted solids suspended in substantially pure extracting liquid are discharged from said other end of said tower, and extract is removed from said tower through said screen means, there thus being formed a filter cake agglomerating on said screen means, said filter cake being periodically detached from said screen means by intermittently feeding back a minor amount of said removed extract through said screen means to said tower at predetermined intervals of time, the improvement that simultaneously with each of said intermittent back-feedings, the rate of movement of said solids longitudinally of said tower and parallel to said screening surfaces is instantaneously increased in a direction toward said other end of the tower to an amount significantly greater than said overall average rate to thus push said filter cake along said screening surfaces and towards said other end of said tower simultaneously with the loosening of the cake from said surfaces by said back-feedings, said increased rate of movement being effected by either one or both of two steps, one of said steps being instantaneously introducing a large volume of said suspension at said one end of said tower synchronously with each intermittent back feeding of said extract through said screen means, the other of said steps being instantaneously discharging a large volume of said extracted solids suspended in substantially pure extracting liquid from said other end of said tower synchronously with each intermittent back feeding of said extract through said screen means.

2. The process of claim 1 in which said solids are cellulose fibers, said liquid suspending medium is waste liquor from a cellulose digestion process, said extracting liquid is water, and said extract is recovered waste liquor.

3. The process of claim 1 wherein said increased rate of movement is effected by said one of said steps.

4. The process of claim 1 wherein said increased rate of movement is effected by said other of said steps.

5. The process of claim 1 wherein said increased rate of movement is effected by said both of said steps.

6. The process of claim 3 wherein said large volume is substantially less than the total volume of materials in said tower.

7. The process of claim 4 wherein said large volume is substantially less than the total volume of materials in said tower.

8. The process of claim 5 wherein each of said large volumes is substantially less than the total volume of materials in said tower.

References Cited

UNITED STATES PATENTS

| | | | |
|---|---|---|---|
| 2,423,172 | 7/1947 | Booth | 210—82 |
| 2,828,862 | 4/1958 | Johnson | 210—82 |
| 2,919,991 | 1/1960 | Ratche | 23—273 X |
| 2,990,238 | 6/1961 | Kabisch | 210—82 X |
| 3,043,431 | 7/1962 | Dudley | 210—433 X |
| 3,097,987 | 7/1963 | Sloman | 162—237 X |
| 3,261,170 | 7/1966 | McCarthy | 23—273 X |

FOREIGN PATENTS 1,156,385  10/1963  Germany.

NORMAN YUDKOFF, Primary Examiner

S. J. EMERY, Assistant Examiner

U.S. Cl. X.R.

23—270; 210—412